United States Patent
Reich et al.

(10) Patent No.: US 9,612,063 B2
(45) Date of Patent: Apr. 4, 2017

(54) SUPPORT FOR A HEAT EXCHANGER TUBE BUNDLE

(71) Applicant: Altex Industries Inc., Edmonton (CA)

(72) Inventors: Dave Reich, Edmonton (CA); Durwill Dennis, Edmonton (CA); Robert Triplett, Edmonton (CA)

(73) Assignee: Altex Industries Inc., Edmonton (CA)

( * ) Notice: Subject to any disclaimer, the term of this patent is extended or adjusted under 35 U.S.C. 154(b) by 369 days.

(21) Appl. No.: 14/448,907

(22) Filed: Jul. 31, 2014

(65) Prior Publication Data
US 2016/0033210 A1 Feb. 4, 2016

(51) Int. Cl.
*B23P 19/02* (2006.01)
*F28F 9/013* (2006.01)
(Continued)

(52) U.S. Cl.
CPC ............ *F28F 9/013* (2013.01); *B23P 19/024* (2013.01); *B60P 3/00* (2013.01); *B60P 3/40* (2013.01); *F28G 15/00* (2013.01); *F28F 2280/02* (2013.01)

(58) Field of Classification Search
CPC ...... B60P 3/00; B60P 3/40; B60P 3/48; B60P 3/41; Y10T 29/53113; Y10T 29/5796; Y10T 29/5383; Y10T 29/53961; Y10T 29/53974; Y10T 29/4935; Y10T 29/49352; Y10T 29/49815; Y10T 29/49819; Y10T 29/49822; Y10T 29/5124; Y10T 29/5135;
(Continued)

(56) References Cited

U.S. PATENT DOCUMENTS 3,048,280 A * 8/1962 Huff ...................... B23P 19/024
165/78
3,126,103 A * 3/1964 Postelwaite et al. . B23P 19/024
254/30
(Continued)

FOREIGN PATENT DOCUMENTS

WO 9613420 A1 5/1996

OTHER PUBLICATIONS

"Hydro-Extractor," Gulf Coast Extractors, <http://gcextractors.com/extractor/>, 1 page, at least as early as Jun. 2013.
(Continued)

*Primary Examiner* — Jason L Vaughan
(74) *Attorney, Agent, or Firm* — Christensen O'Connor Johnson Kindness PLLC

(57) ABSTRACT

There is provided a support for supporting a bundle of exchanger tubes that has plurality of tubes and support plates that engage and support the plurality of tubes. The support has a cradle with a plurality of support surfaces spaced along the length of the cradle to support the bundle of exchanger tubes, a carriage that is movably mounted to a track extending along the length of the cradle such that the carriage traverses at least a portion of the cradle as it moves along the track. The carriage has a receiver portion that moves along the cradle above the support surface and is sized to receive a support plate of the bundle of exchanger tubes, and one or more lifts positioned along the cradle length, the lifts moving vertically between an extended position above the carriage relative to the cradle and a refracted position below the support surfaces.

8 Claims, 7 Drawing Sheets

(51) Int. Cl.
*B60P 3/00* (2006.01)
*F28G 15/00* (2006.01)
*B60P 3/40* (2006.01)

(58) Field of Classification Search
CPC ............. Y10T 29/5136; Y10T 29/5137; Y10T 29/534; Y10T 29/53404; Y10T 29/53409; Y10T 29/53413; B23P 6/00; B23P 15/26; B23P 19/04; B23P 2700/00
See application file for complete search history.

(56) References Cited

U.S. PATENT DOCUMENTS

| | | | | |
|---|---|---|---|---|
| 3,180,498 A | * | 4/1965 | Postlewaite | B23P 19/024 254/106 |
| 3,239,076 A | | 3/1966 | Huff et al. | |
| 3,239,077 A | | 3/1966 | Huff et al. | |
| 3,257,001 A | * | 6/1966 | Postlewaite | B23P 19/024 254/100 |
| 3,381,974 A | | 5/1968 | Carter et al. | |
| 3,399,791 A | | 9/1968 | Goodwin | |
| 3,510,012 A | * | 5/1970 | Van Meteren | B23P 19/024 254/105 |
| 3,567,044 A | * | 3/1971 | Travis | B23P 19/024 254/105 |
| 3,658,191 A | * | 4/1972 | Murphy | B23P 19/024 212/167 |
| 3,836,015 A | * | 9/1974 | Travis | B23P 19/024 254/105 |
| 3,935,951 A | * | 2/1976 | Claus | B23P 19/024 29/726.5 |
| 3,954,187 A | * | 5/1976 | van der Woerd | B23P 19/024 212/314 |
| 4,053,062 A | * | 10/1977 | Travis | B23D 19/02 254/105 |
| 4,125,928 A | * | 11/1978 | Cawley | B23P 19/022 29/252 |
| 4,227,854 A | * | 10/1980 | Coffey | B23P 19/022 254/111 |
| 4,323,398 A | | 4/1982 | Simon | |
| 4,358,242 A | * | 11/1982 | Davies | B23P 19/024 29/726.5 |
| 4,392,524 A | * | 7/1983 | Bauch | F28G 15/02 165/76 |
| 4,543,711 A | * | 10/1985 | Wada | B23P 19/022 29/281.1 |
| 4,575,305 A | | 3/1986 | Krajicek et al. | |
| 4,645,406 A | | 2/1987 | Cooper et al. | |
| 4,666,365 A | | 5/1987 | Cradeur | |
| 4,854,407 A | | 8/1989 | Wagner | |
| 4,869,638 A | * | 9/1989 | Krajicek | B23P 19/024 29/726.5 |
| 5,032,054 A | * | 7/1991 | Krajicek | B23P 19/024 29/726.5 |
| 5,056,806 A | | 10/1991 | Johnson | |
| 5,203,072 A | * | 4/1993 | Boisture | B23P 19/024 29/726 |
| 5,228,191 A | * | 7/1993 | Casterline | B23P 19/024 29/726 |
| 5,323,529 A | * | 6/1994 | Amuny | B23P 19/024 29/723 |
| 5,346,233 A | | 9/1994 | Moser | |
| 5,564,179 A | * | 10/1996 | Amuny | B23P 19/024 29/726 |
| 5,658,000 A | | 8/1997 | Boudreaux | |
| 5,836,730 A | | 11/1998 | Boydstun, IV et al. | |
| 6,171,036 B1 | | 1/2001 | Boydstun, IV et al. | |
| 6,729,833 B2 | | 5/2004 | Cichon et al. | |
| 7,072,763 B2 | | 7/2006 | Saxon et al. | |
| 8,028,784 B1 | | 10/2011 | Van Ginkel | |
| 8,057,607 B2 | * | 11/2011 | Gardner | B08B 9/04 134/166 C |
| 2002/0182048 A1 | * | 12/2002 | Boisture | B23P 19/024 414/745.3 |
| 2012/0255151 A1 | | 10/2012 | Pittman | |
| 2013/0034422 A1 | | 2/2013 | Warburton | |

OTHER PUBLICATIONS

"New Trailer Features Hydraulically Movable Axles," Engineering News, Aug. 2012, <http://www.engineeringnews.co.za/article/new-trailer-features-hydraulically-movable-axles-2012-08-24>, 3 pages.

* cited by examiner

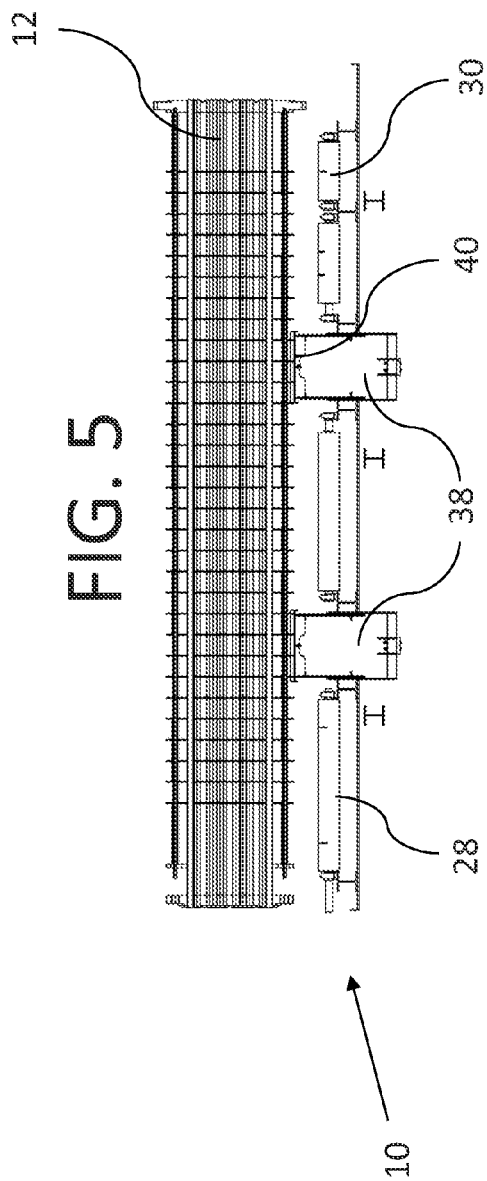
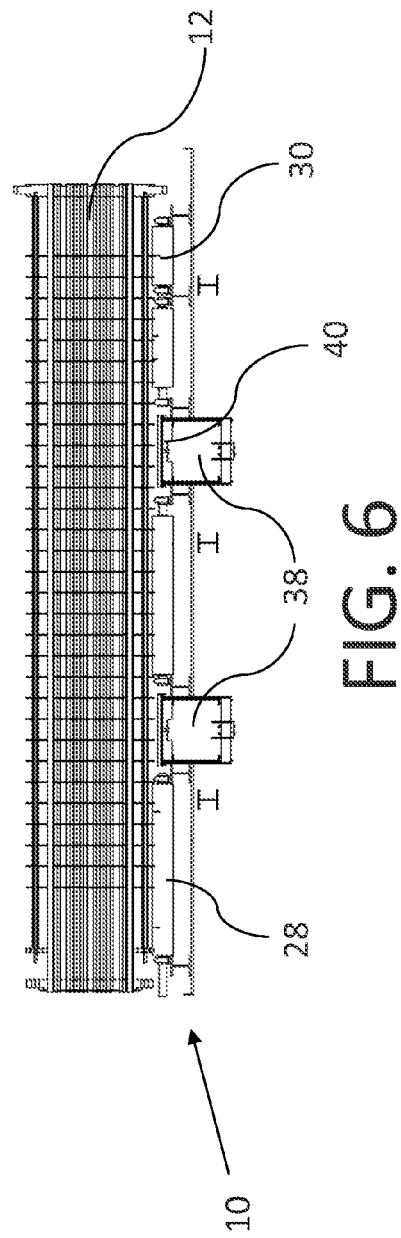

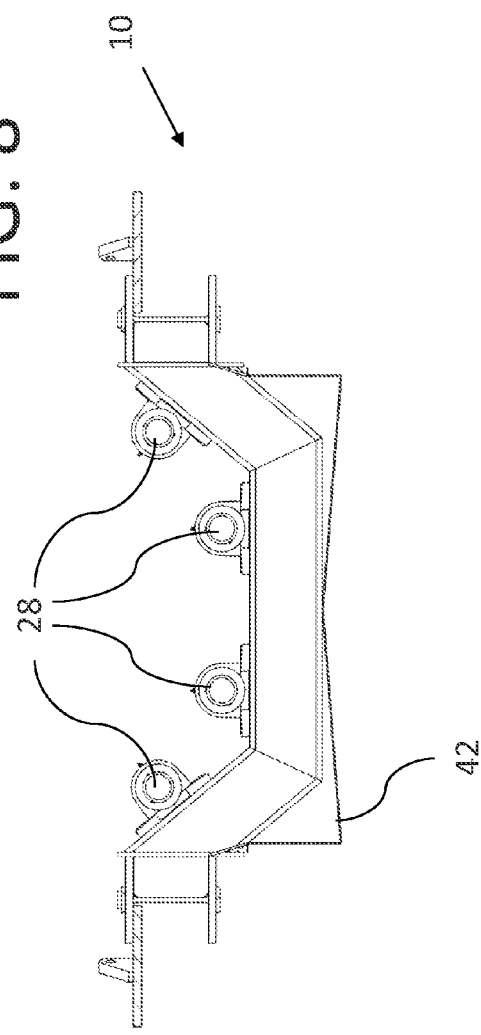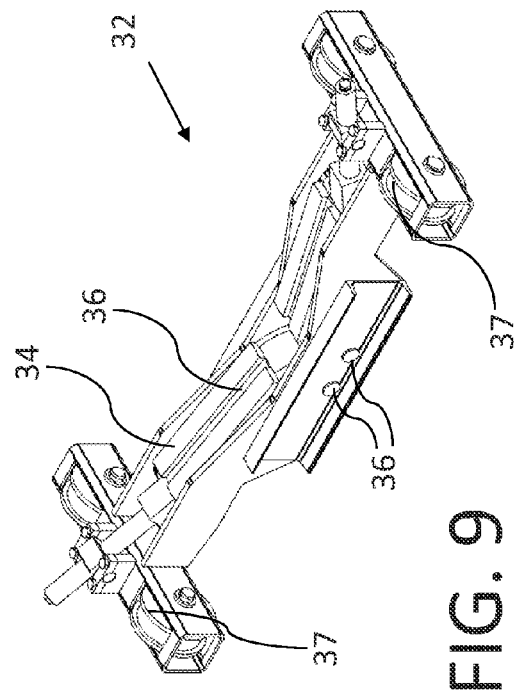

SUPPORT FOR A HEAT EXCHANGER TUBE BUNDLE

TECHNICAL FIELD

This relates to a support for supporting a bundle of tubes, such as a bundle that may be found in a heat exchanger.

BACKGROUND

Many industrial operations require the use of heat exchangers. Some types of heat exchangers have a housing with a bundle of exchanger tubes within the housing. When it becomes necessary to service the heat exchanger, which may include repairs and cleaning, the bundle of tubes must often be withdrawn from the housing. As heat exchangers can be large and heavy, specialized equipment is required in order to remove and reposition the bundle of tubes outside the housing. This often involves the use of a crane or a bundle extractor such as an aerial tube bundle extractor available from Peinemann Equipment B.V. located in Hoogvliet, The Netherlands. This allows bundles to be extracted from the exchanger housing without the need for a crane.

SUMMARY

According to an aspect, there is provided a support for supporting a bundle of exchanger tubes, the bundle of exchanger tubes comprising a plurality of tubes and support plates that engage and support the plurality of tubes, the support plates being perpendicular to the tubes, the support comprising, a cradle having a length, a plurality of support surfaces spaced along the length of the cradle to support the bundle of exchanger tubes on the cradle, a carriage that is movably mounted to a track of the cradle, the track extending along the length of the cradle such that the carriage traverses at least a portion of the cradle as it moves along the track, the carriage having a receiver portion that moves along the cradle above the support surface and that is sized to receive a support plate of the bundle of exchanger tubes, and one or more lifts positioned along the length of the cradle, the lifts moving vertically between an extended position above the carriage relative to the cradle and a refracted position below the plurality of support surfaces.

According to another aspect, the cradle may further comprise ground engaging wheels that support the cradle above a ground surface.

According to another aspect, the plurality of support surfaces may comprise a plurality of rollers, the rollers rolling in a direction perpendicular to the length of the cradle.

According to another aspect, the plurality of rollers may be spaced along the length of the cradle to engage a plurality of the support plates of the bundle of exchanger tubes.

According to another aspect, the plurality of rollers may comprise a plurality of sets of rollers, each set of rollers may comprise two or more rollers, each roller in each set of rollers may be disposed along a curve that approximates a curvature of the exchange tubes.

According to another aspect, the plurality of rollers may comprise at least one driven roller that applies a rotary force to the bundle of exchanger tubes to roll the exchanger tubes along an axis parallel to the length of the cradle.

According to another aspect, the lifts may comprise a curved engagement surface that approximates the curvature of the bundle of exchanger tubes.

According to another aspect, the cradle may further comprise a collection tray for collecting wash fluid and contaminants falling from the bundle of exchanger tubes during cleaning, the collection tray having a drain.

According to an aspect, there is provided a method of servicing a bundle of exchanger tubes, the bundle of exchanger tubes comprising a plurality of tubes, and support plates that engage and support the plurality of tubes, the support plates being perpendicular to the tubes, the method comprising the steps of providing an exchanger tube support comprising a cradle having a length, a plurality of support surfaces spaced along the length of the cradle, a carriage that is movably mounted to a track of the cradle, and one or more lifts positioned along the length of the cradle, withdrawing a portion of the bundle of exchanger tubes from an exchanger housing, causing a receiver portion of the carriage to engage a support plate of the portion withdrawn from the exchanger housing, continuing to withdraw the bundle of exchanger tubes from the exchanger housing while moving the carriage along the cradle, the receiver portion moving above the support surfaces and supporting the exchanger tube portion, once the bundle of exchanger tubes is positioned above the cradle, causing the lifts to extend vertically upward to engage and lift the exchanger tubes above the support surfaces and above the carriage, removing the carriage from below the bundle of exchanger tubes, and lowering the lifts until at least some of the plates of the bundle of exchanger tubes support the bundle of exchanger tubes on the support surfaces.

According to another aspect, the cradle may further comprise ground engaging wheels that support the cradle above a ground surface.

According to another aspect, the plurality of support surfaces may comprise a plurality of rollers, the rollers rolling in a direction perpendicular to the length of the cradle.

According to another aspect, the plurality of rollers may be spaced along the length of the cradle to engage a plurality of the support plates of the bundle of exchanger tubes.

According to another aspect, the plurality of rollers may comprise a plurality of sets of rollers, each set of rollers may comprise two or more rollers, each roller in each set of rollers may be disposed along a curve that approximates a curvature of the exchange tubes.

According to another aspect, the plurality of rollers may comprise at least one driven roller and may further comprise the step of applying a rotary force to roll the bundle of exchanger tubes along an axis parallel to the length of the cradle.

According to another aspect, the lifts may comprise a curved engagement surface that approximates the curvature of the bundle of exchanger tubes.

According to another aspect, the cradle may further comprise a collection tray, and the method may further comprise the step of washing the bundle of exchanger tubes and collecting wash fluid and contaminants that fall from the bundle of exchanger tubes during cleaning.

BRIEF DESCRIPTION OF THE DRAWINGS

These and other features will become more apparent from the following description in which reference is made to the appended drawings, the drawings are for the purpose of illustration only and are not intended to be in any way limiting, wherein:

FIG. 5 is a side elevation view of a support for supporting a bundle of exchanger tubes with lifts in an extended position.

FIG. 6 is a side elevation view of a support for supporting a bundle of exchanger tubes with lifts in a refracted position.

FIG. 8 is a cross-section view of the support for supporting a bundle of exchanger tubes showing the rollers.

FIG. 9 is a perspective view of a carriage.

DETAILED DESCRIPTION

Figure 1:
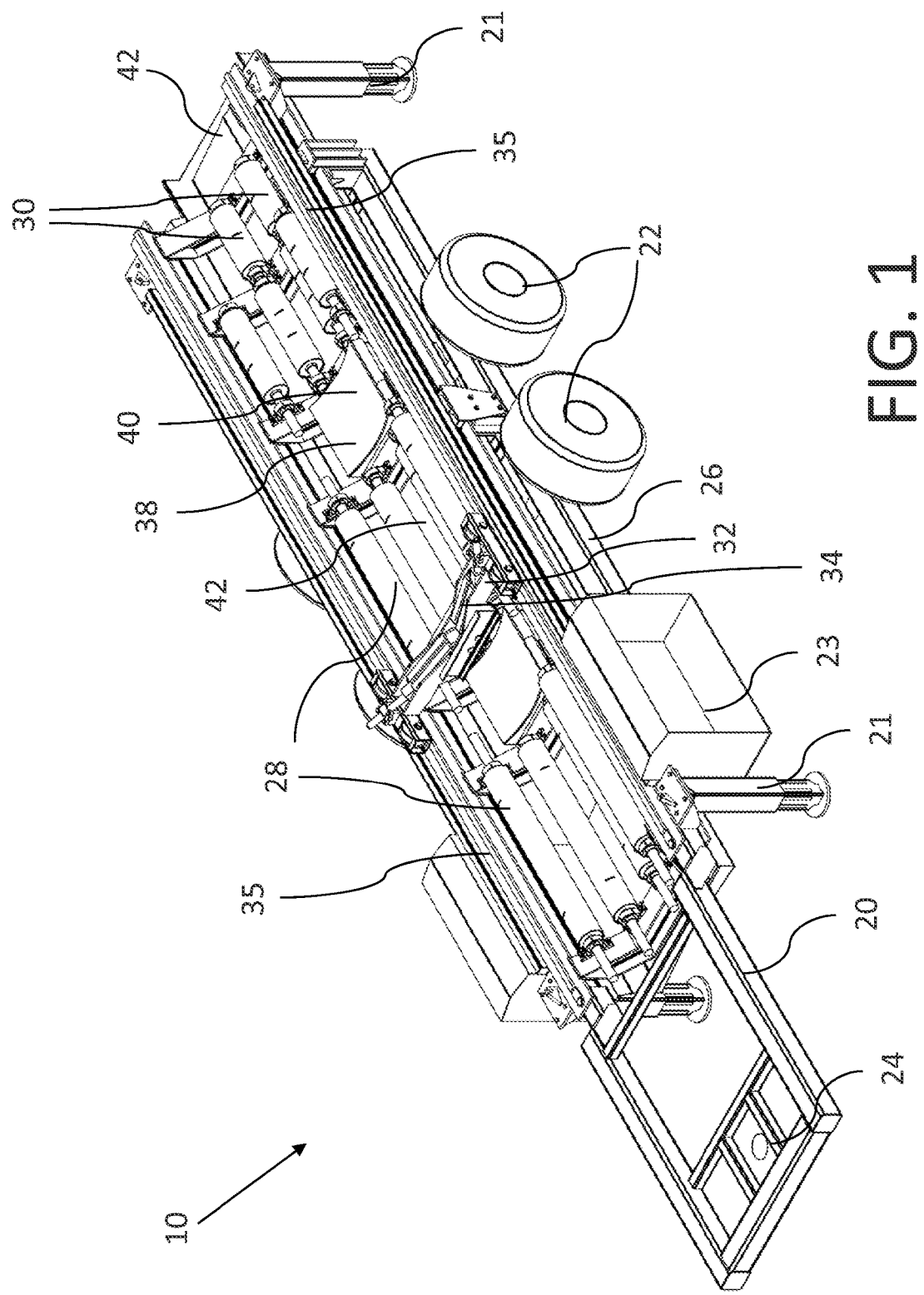
FIG. 1 is a perspective view of a support for supporting a bundle of exchanger tubes.

A support for supporting a bundle of exchanger tubes, generally identified by reference numeral 10, will now be described with reference to FIGS. 1-9.

Figure 3:
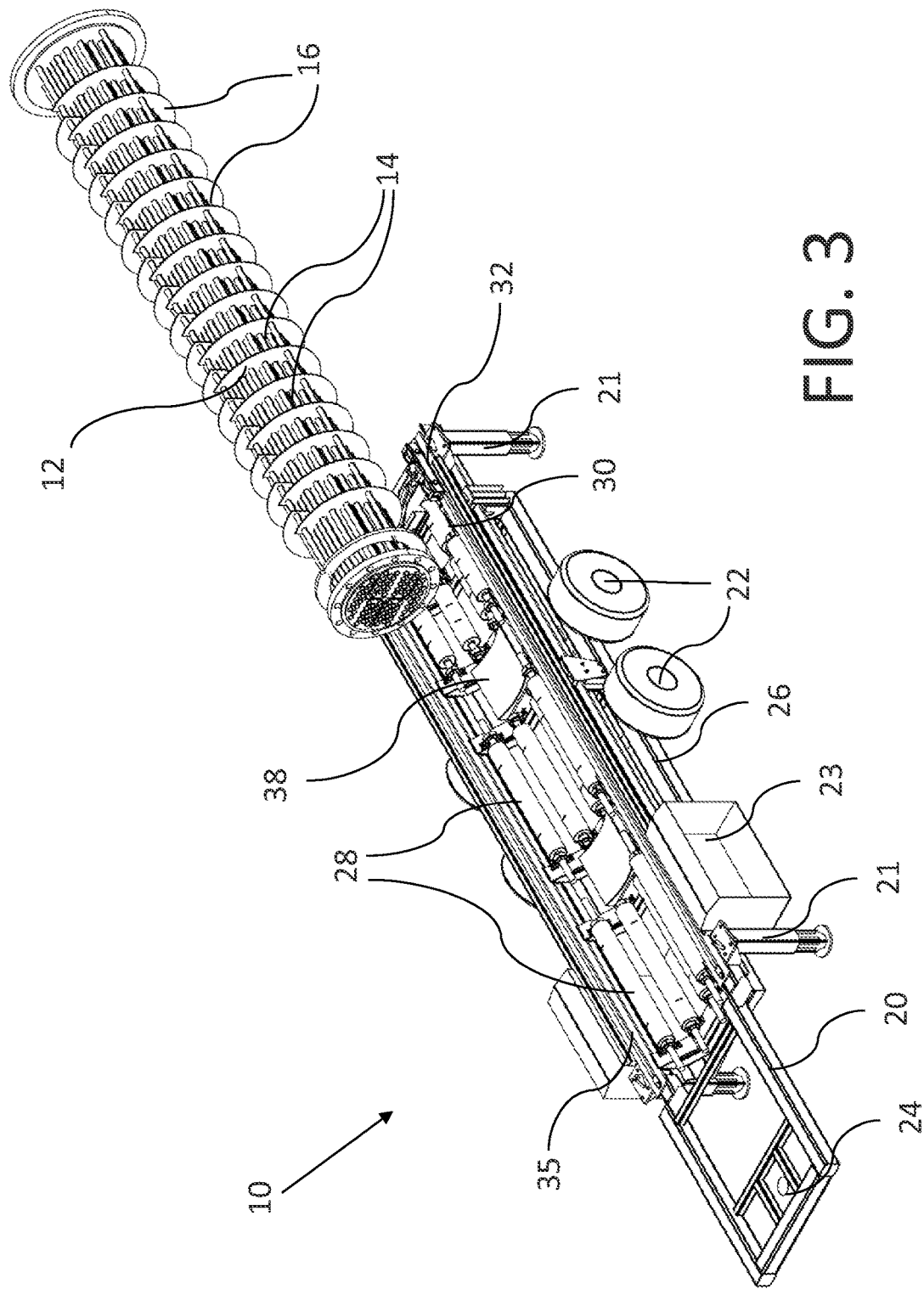
FIG. 3 is a perspective view of a support for supporting a bundle of exchanger tubes showing the bundle of exchanger tubes being loaded onto the support.

Referring to FIG. 3, there is shown a bundle of exchanger tubes 12 that has a plurality of tubes 14 and support plates 16 that engage and support the plurality of tubes 14. Support plates 16 are transverse to tubes 14. Generally, support plates 16 will be perpendicular, but some bundles may have a helical design, such that they may not be perpendicular. When in use, bundle 12 is contained within a heat exchanger housing, and must be withdrawn from the housing in order to be services, such as to repair or clean exchanger tubes 14. It will be understood that bundle 10 may take various forms and may be various sizes. In a preferred embodiment, support plates 16 have a round circumference, and are positioned periodically along tubes 14 in order to maintain their separation and their overall shape and relative position.

Figure 2:
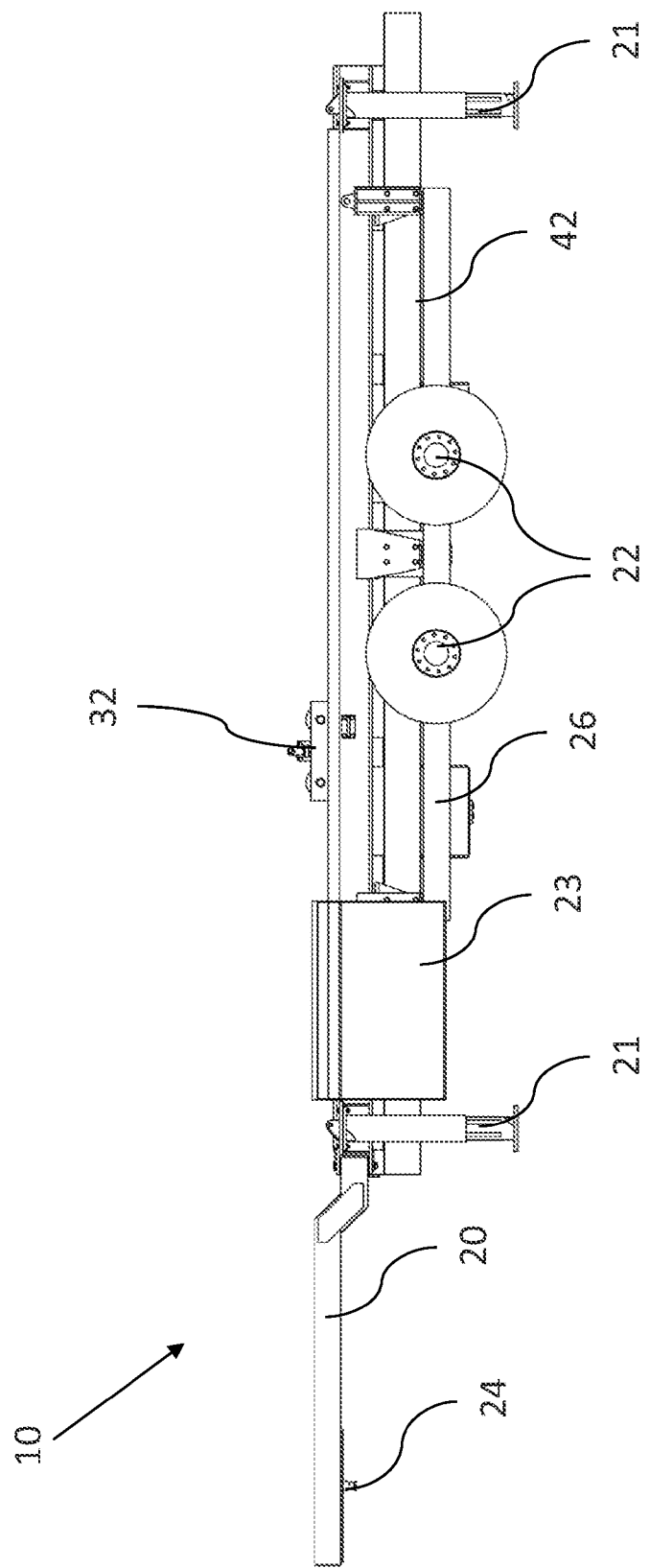
FIG. 2 is a side elevation view of a support for supporting a bundle of exchange tubes.

Referring to FIGS. 1 and 2, support 10 has a cradle 20. Preferably, support 10 is mobile and has a set of ground engaging wheels 22 and a fifth wheel attachment 24. This allows support 10 to move bundle 12 to another service location, such as a cleaning bay or repair shop. It will be understood that support 10 may be made mobile in various ways and that the depicted embodiment is merely one example. For example, cradle 20 may be self-powered. In the depicted embodiment, wheels 22 are mounted to an axle frame 26, which is built sufficiently strong to bear the weight of cradle 20 and a bundle of exchanger tubes 12 when loaded. Given that the size of bundles 12 may vary, it may be desirable to have the ability to move the relative position of ground engaging wheels 22 with respect to cradle 20 in order to equalize the load on cradle 20. This is done by providing actuators (not shown) that are able to shift axle frame 26 relative to cradle 20 in order to properly position the center of gravity. Preferably, this is done by calculating the size and weight of exchanger bundle 12 before it is loaded on cradle 20. Cradle 20 also preferably has outriggers 21 to stabilize cradle 20 when loading and unloading bundle 12, and a control box 23 for housing electrical or hydraulic controls, equipment, etc.

Figure 4:
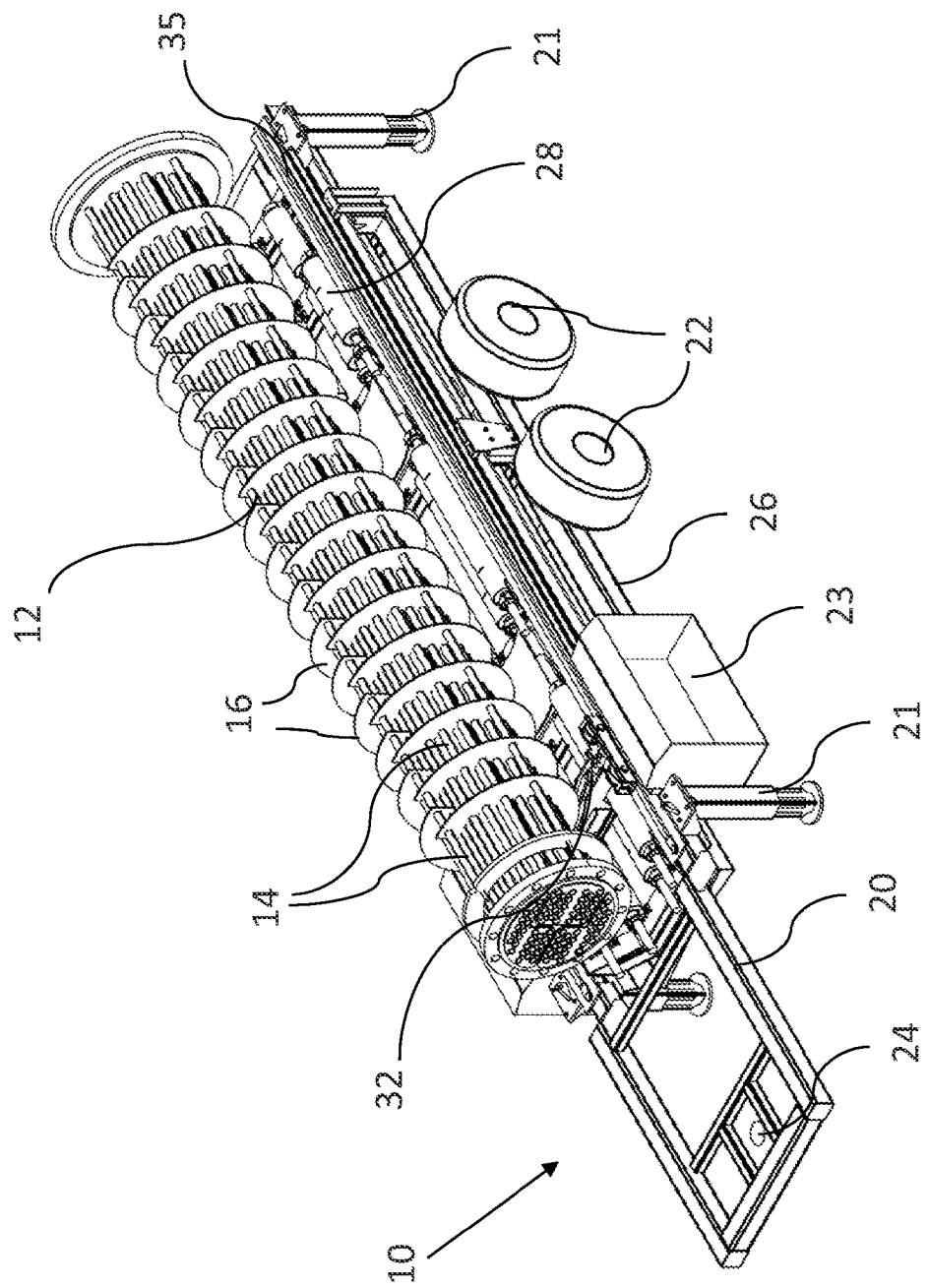
FIG. 4 is a perspective view of a support for supporting a bundle of exchanger tubes with the bundle of exchanger tubes loaded onto the support.

Referring to FIG. 1, cradle 20 also has support surfaces 28 that extend along the length of cradle 20. Support surfaces 28 support bundle of exchanger tubes 12 on cradle 20, as shown in FIG. 4. Rollers 28 that are spaced along the length of cradle 20 are preferred as these permit bundle 12 to be rotated when mounted on cradle 20. In order to facilitate this, there may be one or more driven roller. This may vary, but preferably rollers 28 that are closest to the control box 23 will be driven for simplicity. There may be many driven rollers that are linked together such as by a chain and sprocket design to the rollers that are driven directly. Other non-driven rollers are idlers that support and permit the rotation of bundle 12. If rotation is not required, it may be possible to merely provide support surfaces 28 as a stationary, single surface, or segmented surface that supports bundle 12.

As shown in FIG. 8, rollers 28 are preferably provided in a group of rollers 28 that are positioned along an arc that approximates the curvature of bundle 12. Preferably, rollers 28 engage support plates 16, such that it is the curvature of support plates 16 that should be matched. In some embodiments, the position of rollers 28 along the curvature may be adjusted in order to adjust to different sizes of bundles of exchanger tubes 12. Rollers 28 are also positioned along the length of cradle 10 in order to engage multiple plates 16 at the same time. As will be understood, it is preferred to support bundles 12 by plates 16 in order to reduce deformation and for ease of handling.

In order to help position bundle 12 above cradle 20, a carriage 32 is provided. As shown in FIGS. 3 and 4, carriage 32 is mounted on a track 35 that extends along the length of cradle 20 and has rollers 37 that permit carriage 32 to move along track 35. Using track 35, carriage 32 is able to traverse at least a portion of cradle 20. As shown in FIG. 9, carriage 32 has a receiver portion 34 that moves along cradle 20 above rollers 28. Receiver portion 34 is shown to have a slot 36 that receives a support plate 16 of bundle 12 that is being serviced. It will be understood that other designs of carriage 32 are possible beyond what is depicted. For example, carriage 32 may have two receiver portions in order to simultaneously support two support plates 16. Carriage 32 may move along track 35 using a different design. Rather than a slot 36, receiver portion 34 may take other forms, such as a clamp. As shown, slot 36 is adjustable using bolts 38 that allow the size of slot 36 to be adjusted to match bundle 12 being serviced. Receiver portion 34 receives an end of bundle 12 as it is withdrawn from an exchanger housing (not shown) or as it is received from bundle extraction equipment (not shown). As bundle 12 is moved over cradle 20, carriage 32 preferably engages one of the support plates 16 at a first end of bundle 12 and acts as a support to bundle 12 at that locations as bundle 12 is moved across and positioned above cradle 20. Once positioned above cradle 20 in the desired position, lifts 38 are used to lift bundle 12 above and out of engagement with carriage 32. This allows carriage 32 to be removed, either by sliding carriage 32 further along cradle 20, or by removing it from cradle 20 altogether. Preferably, carriage 32 is left on cradle 20 is space permits due to its weight. When dealing with heavy weights, it is preferred to use two points of contact, and two lifts 38 are shown. If the length of bundle 12 is such that carriage 32 will be over one of the lifts, it may be necessary to use the bundle extraction equipment to support one end. As can be seen, the rear end of cradle is lower, which provides room for the equipment if necessary. In addition, rollers 30 are designed to be removed to provide additional space in order to properly support bundle 12 during lifting or lowering operations.

Figure 7:
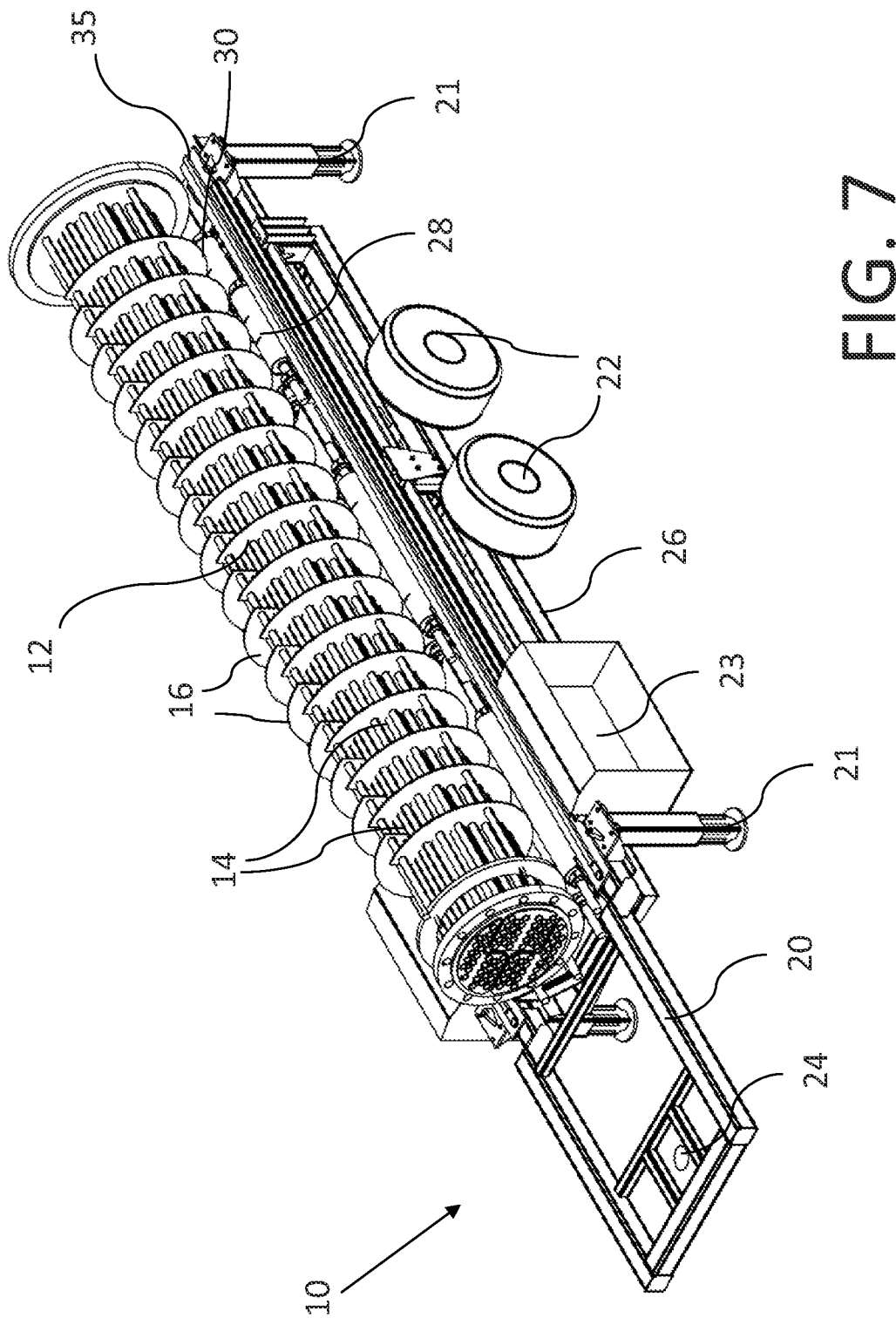
FIG. 7 is a perspective view of a support for supporting a bundle of exchanger tubes with the bundle of exchanger tubes loaded onto the support and the lifts in a refracted position.

Referring to FIGS. 5 and 6, lifts 38 are in the form of actuators that move between an extended position in which the support surface 40 of lifts 38 extend above rollers 28 and carriage 32 and a refracted position below rollers 28, or at least the portion of rollers 28 that engage bundle 12. Lifts 38 allow bundle 12 to be lifted and allow carriage 32 to be removed, such that bundle 12 can then be lowered onto rollers 28 and cradle 20 as shown in FIG. 7. As shown, lifts have a support surface 40 that is preferably curved in order to match the curvature of bundle 12, and in particular, the curvature of plates 16. Preferably, lifts 38 are long enough to engage multiple support plates 16 to spread the load along bundle 12 to reduce the risk of damage.

In some embodiments, it may be desirable to use support 10 to not only support bundle 12, but also to provide a surface to service and clean bundle 12 and to move bundle 12 to different locations. For this purpose, support 10 is preferably mobile, and support surface 28 is preferably rollers to allow bundle 12 to be repositioned. Other features may also be provided. For example, cradle 20 may include clamps that can be used to support a skirt (not shown) that contains any spray or debris to cradle 20. In addition, cradle 20 is provided with a collection tray 42 below rollers 28. Collection tray 42 is useful in collecting wash fluid and contaminants that falling from bundle 12 during cleaning or servicing. Collection tray 42 preferably has a drain (not shown) to drain the liquids and contaminants. When cleaning, it may be desirable to erect a curtain or other barrier (not shown) around bundle 12 once it is mounted on the top of cradle 20. This can be done by mounting supports directly to the sides of cradle 20, or by mounting the supports on the ground if necessary. As shown in FIG. 8, collection tray 42 slopes toward the sides to collect fluid and debris. By adjusting the outriggers, the slope of collection tray 42 can be adjusted toward drains at one end or the other. As shown in FIG. 1, tray 42 also has an extension opposite the end with hitch 24. This allows fluid and debris to be collected from a lancing operation, where high pressure nozzles are inserted into tubes to clean the inside of each tube.

In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be one and only one of the elements.

The scope of the following claims should not be limited by the preferred embodiments set forth in the examples above and in the drawings, but should be given the broadest interpretation consistent with the description as a whole.

What is claimed is:

1. A method of servicing a bundle of exchanger tubes, the bundle of exchanger tubes comprising a plurality of tubes, and support plates that engage and support the plurality of tubes, the support plates being perpendicular to the tubes, the method comprising the steps of:

providing an exchanger tube support comprising a cradle having a length, a plurality of support surfaces spaced along the length of the cradle, a carriage that is movably mounted to a track of the cradle, and one or more lifts positioned along the length of the cradle;

withdrawing a portion of the bundle of exchanger tubes from an exchanger housing;

causing a receiver portion of the carriage to engage a support plate of the portion withdrawn from the exchanger housing;

continuing to withdraw the bundle of exchanger tubes from the exchanger housing while moving the carriage along the cradle, the receiver portion moving above the support surfaces and supporting the exchanger tube portion;

once the bundle of exchanger tubes is positioned above the cradle, causing the lifts to extend vertically upward to engage and lift the exchanger tubes above the support surfaces and above the carriage;

removing the carriage from below the bundle of exchanger tubes; and lowering the lifts until at least some of the support plates of the bundle of exchanger tubes support the bundle of exchanger tubes on the support surfaces.

2. The method of claim 1, wherein the cradle further comprises ground engaging wheels that support the cradle above a ground surface.

3. The method of claim 1, wherein the plurality of support surfaces comprise a plurality of rollers, the rollers rolling in a direction perpendicular to the length of the cradle.

4. The method of claim 3, wherein the plurality of rollers are spaced along the length of the cradle to engage a plurality of the support plates of the bundle of exchanger tubes.

5. The method of claim 4, wherein the plurality of rollers comprises a plurality of sets of rollers, each set of rollers comprising two or more rollers, each roller in each set of rollers being disposed along a curve that approximates a curvature of the exchange tubes.

6. The method of claim 3, wherein the plurality of rollers comprise at least one driven roller and further comprising the step of applying a rotary force to roll the bundle of exchanger tubes along an axis parallel to the length of the cradle.

7. The method of claim 3, wherein the lifts comprise a curved engagement surface that approximates the curvature of the bundle of exchanger tubes.

8. The method of claim 3, wherein the cradle further comprises a collection tray, and further comprising the step of washing the bundle of exchanger tubes and collecting wash fluid and contaminants that fall from the bundle of exchanger tubes during cleaning.

* * * * *